Aug. 11, 1953 W. J. WEEKS 2,648,464
FERTILIZER DISTRIBUTOR
Filed Oct. 25, 1951 3 Sheets-Sheet 1
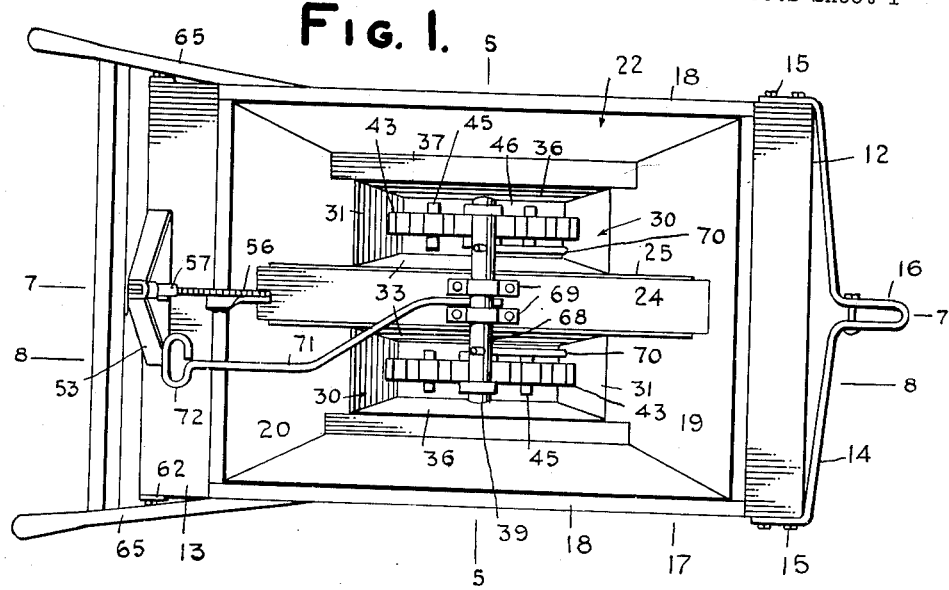
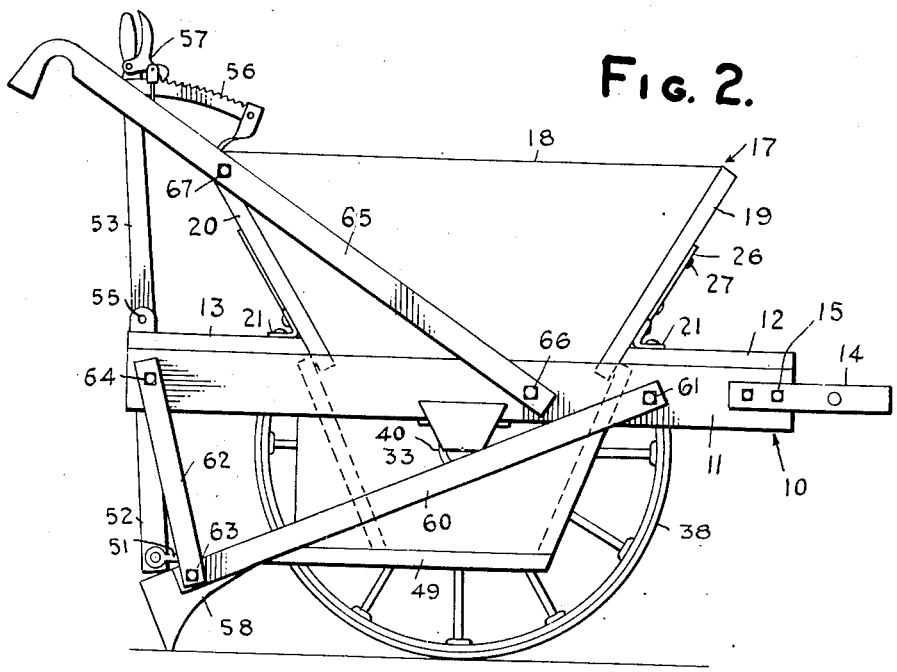
INVENTOR
WILLIAM J. WEEKS
BY
ATTORNEY Aug. 11, 1953 W. J. WEEKS 2,648,464
FERTILIZER DISTRIBUTOR
Filed Oct. 25, 1951 3 Sheets-Sheet 2
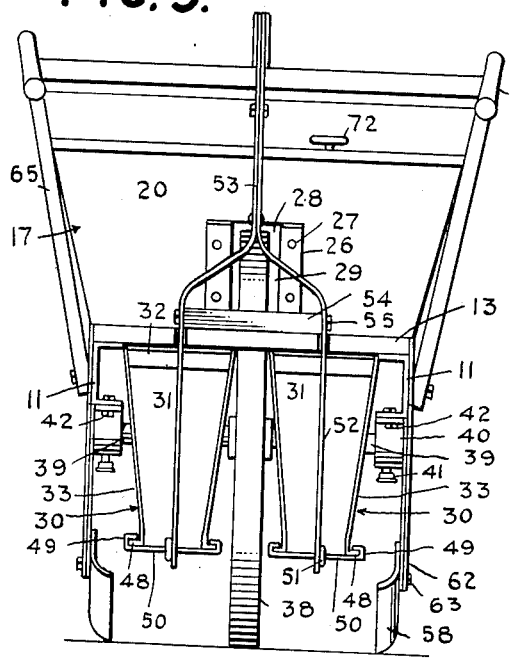
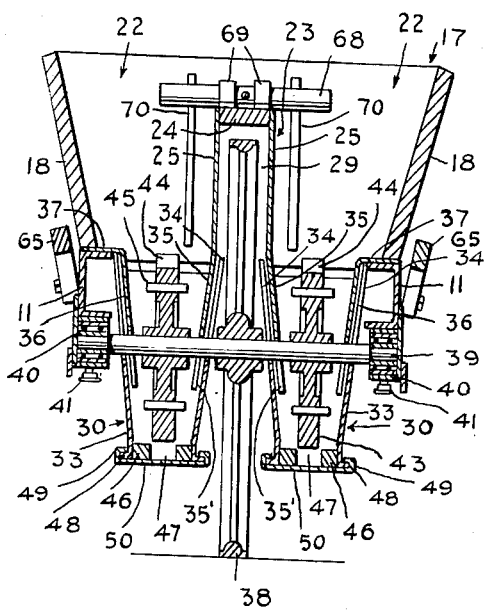
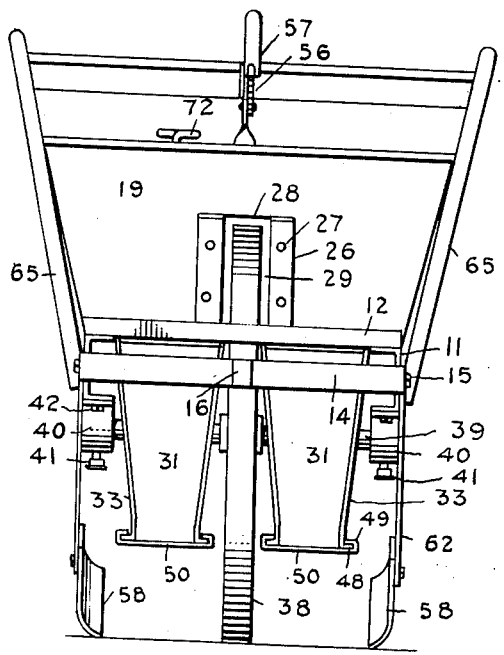
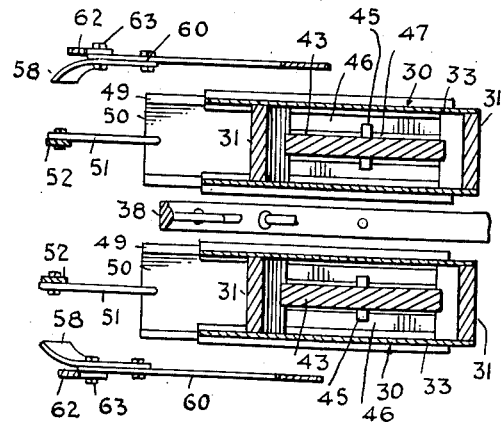
INVENTOR
WILLIAM J. WEEKS
BY
ATTORNEY Aug. 11, 1953

W. J. WEEKS 2,648,464

FERTILIZER DISTRIBUTOR

Filed Oct. 25, 1951

INVENTOR
WILLIAM J. WEEKS

BY *[signature]*

ATTORNEY

Patented Aug. 11, 1953

2,648,464

UNITED STATES PATENT OFFICE 2,648,464

FERTILIZER DISTRIBUTOR

William J. Weeks, Florence, S. C.

Application October 25, 1951, Serial No. 253,055

3 Claims. (Cl. 222—139)

My invention relates to a fertilizer distributor.

An important object of the invention is to provide a fertilizer distributor which will properly discharge the fertilizer without waste due to the wearing of parts.

A further object of the invention is to provide a sowing or dispensing wheel which will properly agitate the fertilizer material while discharging or dispensing the same.

A further object of the invention is to provide an adjustable gate or valve for use in connection with the sowing or dispensing wheel so that the fertilizer material may be discharged or dispensed in a measured amount.

A further object of the invention is to provide sowing or dispensing wheels having pins arranged upon opposite sides thereof so that the wheels will cause a steady and continuous flow of the dispensed fertilizer.

A further object of the invention is to provide an agitator for the fertilizer arranged for retaining the fertilizer in constant contact with the sowing or dispensing wheels.

A further object of the invention is to provide drag fertilizer covers.

A further object of the invention is to provide a distributor of the above-mentioned character so constructed that its parts may be easily assembled and separated for repair or replacement.

Other objects and advantages of the invention will be apparent during the course of the following description.

In the accompanying drawings, forming a part of this application, and in which like numerals are employed to designate like parts throughout the same, Figure 1 is a plan view of a fertilizer distributor embodying my invention, Figure 2 is a side elevation of the same, Figure 3 is a rear end elevation of the same, Figure 4 is a front end elevation of the same, Figure 5 is a transverse vertical section taken on line 5—5 of Figure 1.

Figure 6 is a horizontal section taken on line 6—6 of Figure 8,

Figure 7:
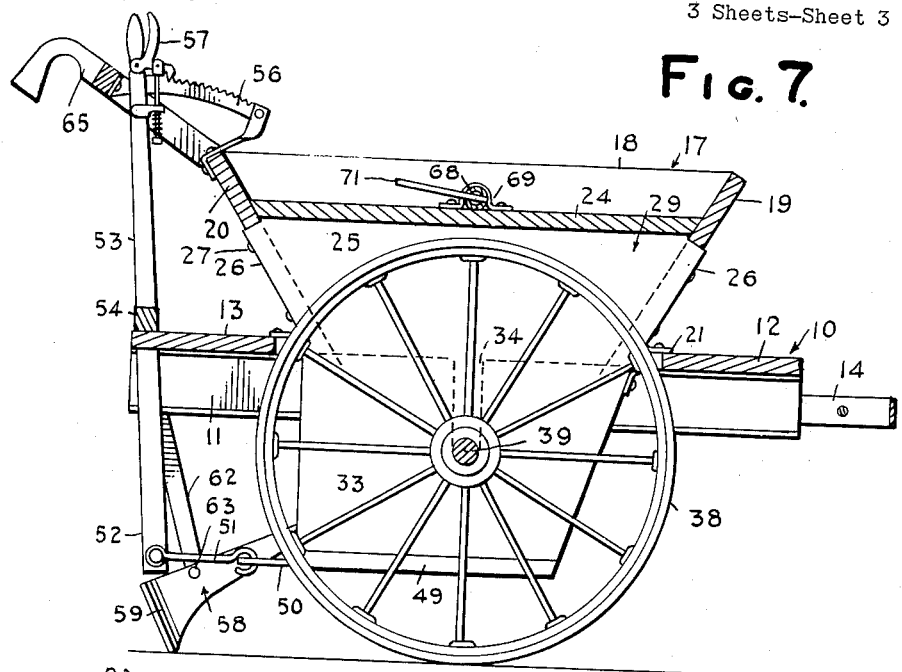
Figure 7 is a vertical section taken on line 7—7 of Figure 1.

In the drawings, where for the purpose of illustration is shown a preferred embodiment of my invention, the numeral 10 designates a horizontal frame, including longitudinal side beams 11, rigidly secured to front and rear transverse strips 12 and 13. The frame is rectangular, as shown, and a hitch or draft appliance 14 is secured to the forward ends of the side beams 11 by bolts 15 and this draft appliance has a loop 16 formed therein for connection with the harness of a draft animal, tractor or the like.

Figure 8:
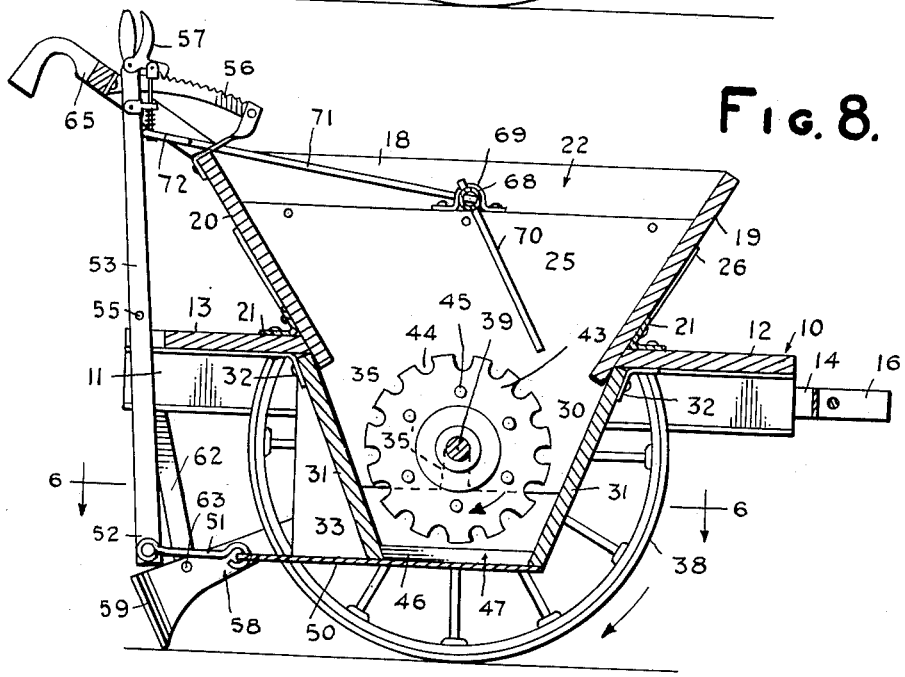
Figure 8 is a similar view taken on line 8—8 of Figure 1.

Mounted upon the horizontal frame 10 is a vertical hopper 17, which tapers downwardly and includes sides 18 and forward and rear ends 19 and 20, which are secured together by nails or the like. The sides 18, Figure 5, rest upon the side beams 11, while the ends 19 and 20 engage the edges of the strips 12 and 13 and extend for a short distance below these strips, Figure 8, and these ends may be rigidly secured to the strips through the medium of brackets 21. The hopper is divided into two longitudinal compartments 22 by means of a vertical hollow partition 23. This partition includes a horizontal top rail 24 and sides 25, which may be formed of sheet metal. These sides are provided at their forward and rear ends with outwardly and laterally projecting flanges 26 secured to the ends 19 and 20 by nails 27 or the like. The ends 19 and 20 are provided with vertical openings 28 for the passage of the sides 25. The hollow partition 23 affords a covered chamber 29, as shown.

The numeral 30 designates hopper compartment extensions arranged beneath the compartments 22. Each hopper compartment extension 30 comprises downwardly converging ends 31 arranged beneath the strips 12 and 13 and secured thereto by brackets 32 or the like. Each extension 30 comprises sides 33 formed of sheet metal and attached to the ends 31. The sides 33 are provided in their upper portions with slots 34, Figures 5 and 7. The sides 25 of the hollow partition 23 have lower ends 35 which project into the compartment extensions 30 and substantially contact with the inner sides 33 and cover the slots 34. The lower ends 35 have slots 35', covered by the inner sides 33. Lower outer sides 36 project into the compartment extensions 30 and cover the slots 34 in the outer sides 33. The sides 36 are provided at their upper ends with horizontal flanges 37 arranged between the sides 18 and the side beams 11, Figure 5.

Mounted to rotate within the chamber 29 of the hollow partition 23 is a main wheel 38, rigidly mounted upon a horizontal transverse shaft 39, the outer ends of which are mounted in bearings 40, which are preferably ball bearings, equipped with grease cups 41. These bearings are arranged beneath the side beams 11 and are rigidly secured thereto by bolts 42 or the like, Figure 3. The shaft 39 extends through the slots 34 and 35', as shown. Rigidly mounted upon the shaft 39, upon opposite sides of the wheel 38 and arranged centrally within the hopper compartment extensions 30, are vertical sowing or dispensing wheels 43. Each wheel is provided in its periphery with pockets 44, Figure 8, and each wheel has an annular group of horizontal agitator pins 45 mounted thereon and extending beyond the opposite faces or ends of the wheel. These pins are disposed inwardly of the pockets 44. Mounted in the bottom of each compartment extension 30 are horizontal strips 46, spaced to afford a narrow elongated slot 47 having a width substantially equal to the thickness of the wheel 43. The wheel 43 operates in close relation to the slot 47. It is thus seen that the sowing or dispensing wheels 43 turn with the main wheel 38 as a unit, thus dispensing with the necessity of intermediate driving mechanism such as gears.

At their lower ends, the sides 33 have outwardly directed horizontal flanges 48, slidably engaged by U-shaped flanges 49 of slide valves or gates 50. These slide valves or gates are arranged beneath the narrow slots 47 and are adapted to cover the slots 47, in whole or in part. When the slide valves or gates 50 are adjusted rearwardly, the forward ends of the slots 47 may be uncovered to the selected degree, whereby a measured amount of the fertilizer will discharge through the slots 46 in continuous streams due to the operation of the sowing or dispensing wheels 43. Pivotally connected with the rear ends of the slide valves or gates 50 are links 51, Figures 3, 7 and 8, and these links are pivotally connected with the sides 52 of a forked lever 53. This lever is pivotally mounted between its ends upon a block 54, Figures 3 and 7, by means of pins or bolts 55 and this block is rigidly mounted upon the rear strip 13, Figure 3. The lever 53 has its upper end operating in close relation to a stationary toothed quadrant 56, rigidly mounted upon the rear end 20 of the hopper. The lever carries a spring pressed latch device 57 for coaction with the stationary toothed quadrant 56 so that the lever may be locked in the selected adjusted position. It is thus seen that a single lever shifts the sliding valves or gates 50.

The numeral 58 designates drag covers, which are substantially vertical shears having inwardly facing lateral extensions 59. These shears operate within the furrow and throw the earth over the fertilizer to cover the same. These coverers overcome the disadvantages encountered with ordinary plows used for this purpose since the plows frequently become caught with underground roots, tearing or damaging the distributor. An attaching unit is provided for mounting each coverer 58 upon the frame. Such unit comprises a long inclined bar 60, having the coverer 58 rigidly mounted thereon and this bar is secured to the beam 11 at its forward end by means of a bolt 61. The bar 60 has an upstanding brace 62 secured thereto at 63 and the brace 62 is secured to the beam 11 by a bolt 64 or the like.

The distributor is equipped with longitudinal inclined handles 65, arranged upon opposite sides of the hopper and the lower ends of these handles are secured to the beams 11 by bolts 66 and the handles are also secured to the hopper by bolts 67. The handles 65 have their rear ends projecting rearwardly beyond the hopper and the lever 53 is at the rear of the hopper and between the handles, as shown.

An agitator is provided to break up any crust which may form upon the fertilizer within the compartments 22 of the hopper. This agitator comprises a horizontal transverse rock shaft 68, journaled in bearings 69, rigidly attached to the rail 24 of the partition 23. The rock shaft 68 extends beyond this partition, upon opposite sides thereof and has agitator rods 70 rigidly mounted thereon. These rods extend radially of the rock shaft and depend below the same and operate within the compartments 22. The rock shaft has a radial rod or handle 71, Figure 1, rigidly secured thereto and this handle extends rearwardly beyond the hopper and has a loop 72 for convenient engagement by the hand. The loop is disposed upon one side of the lever 53. The handles 71 is swung vertically to turn the rock shaft 68 which in turn vertically swings the agitator rods 70. These rods agitate the fertilizer material preventing the formation of a crust upon the upper portion of the same whereby the fertilizer moves downwardly in the compartments 20, continuously, as it is fed through the slots 47.

The operation of the distributor is as follows:

The distributor is moved in a forward direction longitudinally of a previously opened furrow and the wheel 38 travels within this furrow. The distributor may be drawn by a draft animal or by other means. The lever 53 is operated to adjust the slide valves or gates 50 for suitably uncovering the forward ends of the slots 47, to effect the discharge of the fertilizer in a measured amount. The wheel 38 is rotating clockwise, Figure 8, and the sowing or dispensing wheels 43 are also rotating clockwise, Figure 8. The fertilizer material held within the hopper 17 gravitates into the compartment extensions 30 and the wheels 43 become embedded therein. The wheels rotate within the fertilizer, and the wheels 43 and their pins 45 maintain the fertilizer in a state of agitation, breaking up any lump formation. The recesses 44 also advance the fertilizer towards the slots 47. These wheels 43, cooperate with the slide valves or gates 50 to discharge the fertilizer in a continuous stream through the forward ends of the slots 47. The fertilizer is fed into the furrow upon opposite sides of the seed to be more readily utilized by the roots of the plant. The coverers 58 follow the sowing or dispensing of the fertilizer and cover the same with the earth. The action of the agitator in the top of the hopper breaks up any crust which might tend to form upon the fertilizer so that the fertilizer is constantly moving downwardly in the hopper for proper engagement with the wheels 43. All parts of the distributor are well balanced so that the operator walking at the rear of the machine and grasping the handles 65 may conveniently steer the machine.

It is to be understood that the form of the invention herewith shown and described is to be taken as a preferred example of the same, and that various changes in shape, size and arrangement of parts may be resorted to, without departing from the spirit of the invention or the scope of the subjoined claims.

Having thus described my invention, I claim:

1. A fertilizer distributor comprising a generally horizontal frame, a hopper for receiving the fertilizer and arranged above the frame and secured thereto, a substantially vertical hollow partition arranged within the hopper substantially at its transverse center and including sides and a closed top which is arranged at an elevation a considerable distance beneath the top of the hopper, said partition dividing the hopper into transversely spaced compartments, depending hopper compartment extensions secured to the frame and transversely spaced and having their upper ends leading into the lower ends of the hopper compartments, the hollow partition and the depending compartment extensions forming a substantially vertical chamber closed at its top and sides throughout the length of said sides, a transverse shaft arranged beneath the frame and extending through the hopper compartment extensions and having its ends mounted upon the frame, a single ground wheel arranged at substantially the transverse center of the hopper and disposed within said chamber, the sides and top of the chamber preventing the fertilizer from passing into the chamber and contacting with the wheel, rotary fertilizer feeding elements mounted upon the shaft and arranged within the depending hopper compartment extensions, means forming discharge openings at the bottom of the depending hopper compartment extensions, and handles arranged at the rear of the frame and secured thereto.

2. A fertilizer distributor comprising a generally horizontal frame, a hopper for receiving the fertilizer and arranged above the frame and secured thereto, a substantially vertical hollow partition arranged within the hopper at substantially its transverse center and including sides and a closed top which is arranged at an elevation a considerable distance beneath the top of the hopper, said partition dividing the hopper into transversely spaced compartments, depending hopper compartment extensions secured to the frame and transversely spaced and having their upper ends leading into the lower ends of the hopper compartments, the hollow partition and the depending compartment extensions forming a substantially vertical chamber closed at its top and sides throughout the length of said sides, a transverse shaft extending through the hopper compartment extensions and having its ends mounted upon the frame, a ground wheel arranged at substantially the transverse center of the hopper and disposed within the chamber, the sides and top of the chamber preventing the fertilizer from passing into the chamber and contacting with the wheel, rotary fertilizer feeding elements mounted upon the shaft and arranged within the depending hopper compartment extensions, means forming discharge openings at the bottom of the depending hopper compartment extensions, handles arranged at the rear of the frame and secured thereto, a transverse substantially horizontal rock shaft mounted upon the closed top of the hollow partition and having its ends terminating short of the sides of the hopper, depending agitator rods mounted upon the rock shaft, and a handle secured to the rock shaft and generally horizontally arranged and extending beyond the rear end of the hopper and arranged between the first-named handles.

3. A fertilizer distributor comprising a generally horizontal frame, a hopper for receiving the fertilizer and arranged above the frame and secured thereto, a substantially vertical hollow partition arranged within the hopper substantially at its transverse center and including sides and a closed top, said partition dividing the hopper into transversely spaced compartments, depending hopper compartment extensions secured to the frame and transversely spaced and having their upper ends leading into the lower ends of the hopper compartments, the hollow partition and the depending compartment extensions forming a substantially vertical chamber closed at its top and sides throughout the length of the sides, a transverse shaft extending through the hopper compartment extensions and having its ends mounted upon the frame, a ground wheel disposed within said chamber, the sides and top of the chamber preventing the fertilizer passing into the chamber and contacting with the wheel, rotary fertilizer feeding elements mounted upon the shaft and arranged within the depending hopper compartment extensions, slide valves carried by the lower ends of the hopper compartment extensions to regulate the discharge of fertilizer from the hopper compartment extensions, handles arranged rearwardly of the frame and near its sides and secured to the frame, a generally vertical lever having a lower forked portion which is pivotally mounted upon the rear end of the frame between said handles, means for connecting the forked portion with said slide valves, a rock shaft mounted upon the top of said partition and extending transversely of the hopper, agitator elements carried by the rock shaft, and a generally horizontal manually operated handle secured to the rock shaft and extending rearwardly beyond the hopper and arranged between the lever and one handle.

WILLIAM J. WEEKS.

References Cited in the file of this patent
UNITED STATES PATENTS

| Number | Name | Date |
|---|---|---|
| 281,145 | Seay | July 10, 1883 |
| 454,183 | Patterson | June 16, 1891 |
| 721,733 | Nance | Mar. 3, 1903 |
| 774,101 | O'Neal | Nov. 1, 1904 |
| 944,173 | Bullock | Dec. 21, 1909 |
| 1,738,349 | Brich | Dec. 3, 1929 |
| 1,901,301 | Johnson | Mar. 14, 1933 |